(12) United States Patent
Huo et al.

(10) Patent No.: US 10,024,352 B2
(45) Date of Patent: Jul. 17, 2018

(54) LOW PROFILE FASTENING METHOD WITH TORQUE-LIMITING DISENGAGING HEAD

(71) Applicant: Apple Inc., Cupertino, CA (US)

(72) Inventors: Edward S. Huo, San Jose, CA (US); Martin J. Auclair, Cupertino, CA (US); Scott A. Myers, Saratoga, CA (US); Michael B. Wittenberg, Sunnyvale, CA (US); Ashutosh Y. Shukla, Playa Vista, CA (US); Tyler B. Cater, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 15/268,233

(22) Filed: Sep. 16, 2016

(65) Prior Publication Data

US 2017/0089383 A1 Mar. 30, 2017

Related U.S. Application Data

(60) Provisional application No. 62/232,958, filed on Sep. 25, 2015.

(51) Int. Cl.
| | |
|---|---|
| *F16B 31/00* | (2006.01) |
| *F16B 31/02* | (2006.01) |
| *F16B 33/02* | (2006.01) |
| *B29C 65/48* | (2006.01) |
| *B29C 65/56* | (2006.01) |
| *B29K 77/00* | (2006.01) |
| *B29L 31/00* | (2006.01) |
| *B29L 31/34* | (2006.01) |

(52) U.S. Cl.
CPC .......... *F16B 31/021* (2013.01); *B29C 65/48* (2013.01); *B29C 65/562* (2013.01); *F16B 31/00* (2013.01); *F16B 33/02* (2013.01); *B29K 2077/00* (2013.01); *B29L 2031/3437* (2013.01); *B29L 2031/727* (2013.01)

(58) Field of Classification Search
CPC ........ F16B 31/00; F16B 31/02; F16B 31/021; F16B 31/028; F16B 33/02; F16B 37/14
USPC .................................. 411/2, 5, 82–82.2, 373
See application file for complete search history.

(56) References Cited

U.S. PATENT DOCUMENTS

| | | | |
|---|---|---|---|
| 3,561,317 A * | 2/1971 | Rowell | ................. F16B 31/021 411/5 |
| 3,812,757 A | 5/1974 | Reiland | |
| 6,059,786 A | 5/2000 | Jackson | |

(Continued)

*Primary Examiner* — Roberta S Delisle
(74) *Attorney, Agent, or Firm* — Dickinson Wright RLLP

(57) ABSTRACT

A fastener is disclosed. The fastener can be used to couple together two or more parts in an electronic device. The fastener may include a head coupled with a platform having a shaft extending from the platform. The head is coupled with the platform in a manner that allows the head to decouple from the platform. For example, the head is secured with the platform by an adhesive that provides an adhesive bonding force. In this regard, a rotational force applied to the head that is greater than the adhesive bonding force causes the head to decouple from the platform. The shaft may include several blades and several protrusions. The blades may be used to engage one of the parts. The protrusions may also engage the same part as the blades, and interlock with the part to provide a retaining force that prevents the fastener from decoupling from the parts.

20 Claims, 11 Drawing Sheets

(56) References Cited

U.S. PATENT DOCUMENTS

| | | | |
|---|---|---|---|
| 7,014,403 B1 | 3/2006 | Higganbotham et al. | |
| 7,980,801 B2 * | 7/2011 | Kawano | F16B 23/00 |
| | | | 411/399 |
| 8,662,805 B2 * | 3/2014 | Schaeffer | F16B 33/008 |
| | | | 411/1 |

* cited by examiner

LOW PROFILE FASTENING METHOD WITH TORQUE-LIMITING DISENGAGING HEAD

CROSS-REFERENCE TO RELATED APPLICATION(S)

This application claims the benefit of priority under 35 U.S.C. § 119(e) to U.S. Provisional Application No. 62/232,958, filed on Sep. 25, 2015, and titled "LOW PROFILE FASTENING METHOD WITH TORQUE-LIMITING DISENGAGING HEAD," the disclosure of which is incorporated herein by reference in its entirety.

FIELD

The described embodiments relate to fasteners. In particular, the described embodiments relate to fasteners having a shaft and a fastener head, with the fastener head designed to break away from the shaft in response to torque, or twisting force. In addition, some fasteners include several blades designed to engage and interlock with a part.

BACKGROUND

Fasteners are commonly known in the art for securing parts together. A fastener may include a head and a shank. The head may be designed to receive a tool that provides a rotational force to drive the head and the shank into the parts. The shank may be threaded, or partially threaded. The head may be driven until the fastener extends through the parts.

However, some fasteners may not be well-equipped for small spaces. For example, in order to fasten together two or more parts in a desired manner, the shank may require a number of threads, which adds to the overall length of the shank, and in turn, the fastener. Also, the head may be unnecessarily large, due in part to a clearance required between 1) a recess in the head that receives a tool and 2) the shank. Both the head and the shank may cause the fastener to include a length too large for certain applications. For example, when the fastener is used in an electronic device, other components in an electronic device proximate to the fastener must be moved to another location causing a redesign of the electronic device. Alternatively, the component may include a reduced size or may be removed altogether, which may limit the capability of the electronic device.

SUMMARY

In one aspect, a fastener suitable for securing a first part with a second part is described. The fastener may include a platform having a shaft extending from the platform. The fastener may further include a head bonded with the platform by a material that includes a bonding force. In some embodiments, in response to a rotational force to the head greater than the bonding force, the head decouples from the platform.

In another aspect, a fastener used to secure together a first part with a second part is described. The second part may include an extension. The fastener may include a shaft configured to extend through the first part and the second part. The fastener may further include a blade extending radially from the shaft and configured to secure around the extension. The fastener may further include a protrusion extending radially from the shaft and configured to engage the extension to interlock the shaft with the extension.

In another aspect, a method for making a fastener suitable for securing a first part with a second part is described. The method may include forming a platform having a shaft extending from the platform. The method may further include securing the platform with a head by a material that includes a bonding force. In some embodiments, in response to a rotational force to the head greater than the bonding force, the head decouples from the platform.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
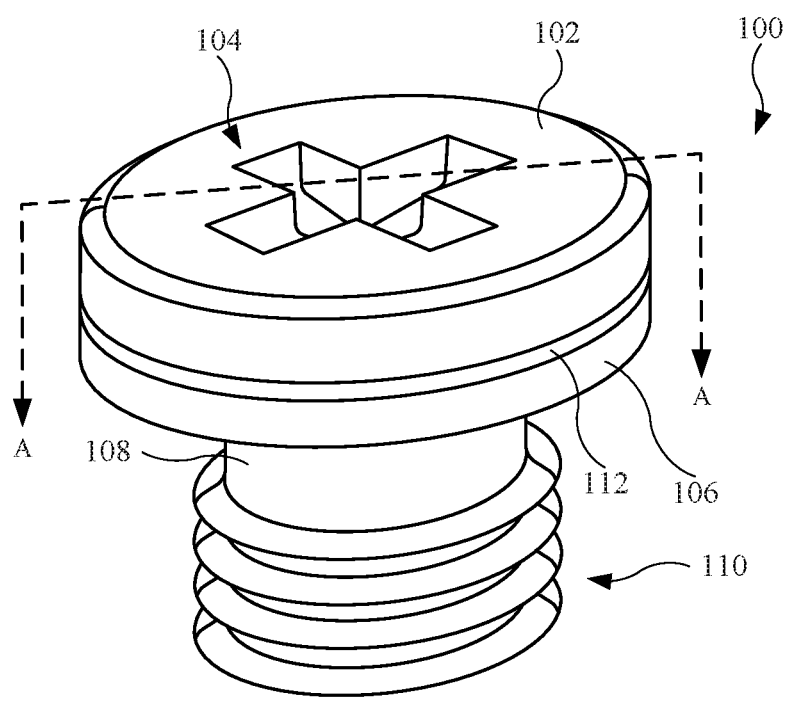
FIG. 1 illustrates an isometric view of an embodiment of a fastener, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to a fastener designed to reduce its overall footprint. For example, a portion of the fastener can be designed to break off, or decouple, from a remaining portion of the fastener after the fastener is positioned to secure together two or more parts. As a result of the decoupled portion, the fastener includes a reduced size and accordingly, occupies less space. In some instances described herein, the fastener is used to secure together parts in an electronic device. Further, the fastener can be used to secure together two or more parts in a relatively small space of the electronic device based upon a removal of the decoupled portion.

In an example embodiment, a fastener may include a platform and a shaft, or shank, extending from the platform. In some cases, the shank is integrally formed with the platform. The phrase "integrally formed" refers to a single, continuous material that may include two or more features. As non-limiting examples, the features may be formed by extruding or machining a single piece of material. The fastener may also include a head secured with the platform and designed to receive a tool to rotationally drive or actuate the fastener through the parts to be fastened together.

The head may be secured with the platform by a material such as an adhesive, an epoxy, or a resin. The material may be selected based upon its known bonding forces or bonding properties in order to create a bond with a predetermined (or known) bonding force between the head and the platform. Using an initial rotational force, or initial torque, the tool may engage the head to rotationally drive the head, which in turn, rotational drives shaft between two or more parts. The initial rotational force may also drive the platform to engage the first part (closest to the platform). At this point, the initial rotational force may no longer drive the fastener, as the platform prevents further movement of the shaft into the parts. However, by providing an additional rotational force, or additional torque, greater than the initial rotational force, the tool causes shear stress to the material used to bond the head with the platform. The additional rotational force is associated with a greater amount of force than that of the initial rotational force. The additional rotational force may overcome the predetermined bonding force (between the head and the platform), causing a breakdown in the material such that the head breaks away, or decouples, from the platform. As a result, the size of the fastener based on the head being removed from the fastener. However, the platform and the shaft remain, and combine to retain and secure the parts together without the head.

In another example embodiment, the threads of the shaft may be replaced by one or more blades, or lobes, which extend radially outward from the shaft. The blades are designed to engage at least one of two or more parts to be secured together. The head may be driven in a rotational manner causing the blades to rotate and engage one of the parts. The shaft may also include several protrusions that also extend radially outward from the shaft. In some cases, one of the parts may include an opening that includes several extensions, or ramps, extending inward in a direction toward the shaft. The number of extensions may correspond to the number of protrusions. In this manner, when the shaft and the blades are rotationally driven into an opening of the part, each blade of (of the shaft) is secured around an extension. Further, each protrusion (of the shaft) engages a protrusion (of the part) to form an interlock between the shaft and the part. The interlock may create frictional forces between the fastener and the part, thereby preventing the fastener from decoupling from, or falling out of, the part.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates an isometric view of an embodiment of a fastener 100 designed to secure together two or more parts, in accordance with the described embodiments. As shown, the fastener 100 may include a head 102, or head portion, that includes a recess 104 designed to receive a tool (not shown). While the recess 104 is shown having a particular size and shape, the size and shape of the recess 104 may vary in other embodiments, according to the desired tool to be used. Also, although not shown, the recess 104 may be removed and the head 102 may include a polygonal shape that may be received by a tool, such as a ratchet, having a size and shape corresponding to that of the head 102. The fastener 100 may further include a platform 106 and a shaft 108 extending from the platform 106. In some embodiments, the shaft 108 is generally smooth and free of threads or other features. In the embodiment shown in FIG. 1, the shaft 108 includes a threaded region 110. Although the threaded region 110 includes a particular number of threads, the threaded region 110 may include fewer or more threads based in part on the size of the shaft 108. The head 102, the platform 106, and the shaft 108 may be formed from a metal, such as steel, aluminum, nickel, or an alloy that combines several metals. Alternatively, the head 102, the platform 106, and the shaft 108 may be formed from a polymeric material, such as plastic. Also, in some embodiments, the shaft 108 is integrally formed with the platform 106.

The head 102 may be secured with the platform 106 by a material 112. In some embodiments, the material 112 is an adhesive material with known adhesive properties. For example, a known adhesive property of the material 112 may include a predetermined adhesive bond strength. In this manner, a predetermined bonding force between the material 112 and the head 102 (at an interface between the material 112 and the head 102) as well as a predetermined bonding force between the material 112 and the platform 106 (at an interface between the material 112 and the platform 106) may be known, or at least approximately known. The predetermined bonding forces may determine a bonding force between the head 102 and the platform 106 by way of the material 112. In this manner, a rotational force provided to the head 102 to overcome the aforementioned bonding forces can be determined. Further, the rotational force may cause the material 112 to break down and release the head 102 from the platform 106. In some instances, the rotational force is applied subsequent to the fastener 100 securing together two (or more) parts. Further, the removal of the head 102 causes a reduction in the size of the fastener 100. This will be shown and described below. Also, when the material 112 is removed along with the head 102, the fastener 100 is further reduced in size.

Figure 2:
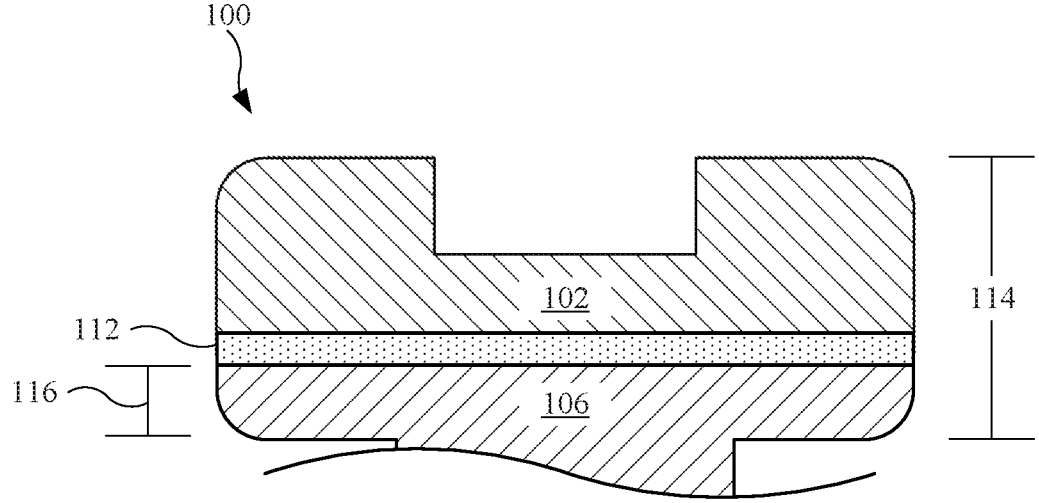
FIG. 2 illustrates a cross sectional view of the fastener shown in FIG. 1, taken along the A-A line in FIG. 1.

FIG. 2 illustrates a cross sectional view of the fastener 100 shown in FIG. 1, taken along the A-A line in FIG. 1. As shown, the material 112 separates the head 102 from the platform 106. Also, the head 102, the platform 106, and the material 112 may combine to define a first dimension 114 of the fastener 100. Further, when the head 102 decouples from the platform 106, and when the material 112 remains on the head 102 (or is otherwise removed from the platform 106), the fastener 100 reduces to a second dimension 116 less than the first dimension 114. The second dimension 116 may define a low-profile fastener having a reduced size without the head 102. As a result of the reduced dimensional profile, or reduced footprint, the fastener 100 may occupy less volume, which may be useful when the fastener 100 is located in a relatively small space.

Figure 3:
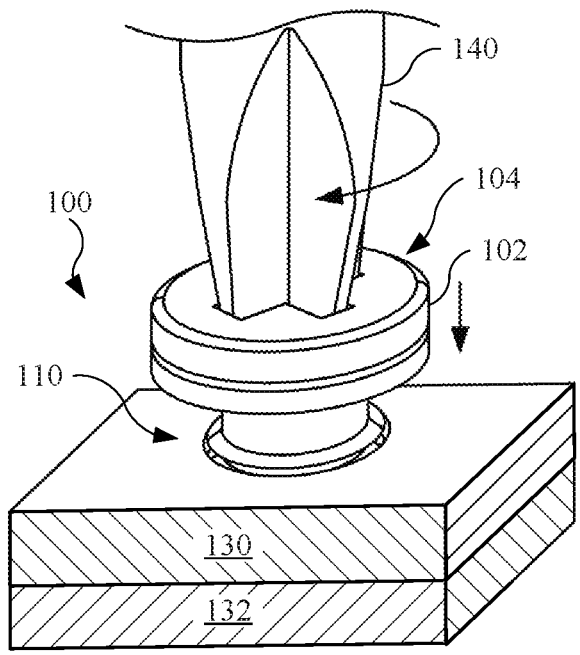
FIG. 3 illustrates an isometric view of the fastener driven into a first part and a second part.

FIGS. 3-6 show a fastening operation using the fastener 100 shown and described in FIGS. 1-2. The fastening operation may include using the fastener 100 to secure together multiple parts. FIG. 3 illustrates an isometric view of the fastener 100 driven into a first part 130 and a second part 132. For purposes of simplicity, only a portion of the first part 130 and the second part 132 are shown. However, in some embodiments, the first part 130 and the second part 132 are structural components in an electronic device (not shown). For example, the first part 130 may include a support feature or frame that carries a protective layer, such as a cover glass. Further, the second part 132 may include a support feature for an operational component used by the electronic device, such as a circuit board. Also, while only the first part 130 and the second part 132 are shown, the fastener 100 may be designed to engage and secure together three or more parts.

As shown in FIG. 3, the fastener 100, by way of the recess 104 in the head 102, receives a tool 140 that rotationally drives the fastener 100, causing a threaded engagement between the threaded region 110 of the fastener 100 and a threaded region (not shown) of the first part 130 and/or the second part 132. In other embodiments in which the fastener 100 does not include the threaded region 110, the fastener 100 may be disposed in the first part 130 and the second part 132 without a driving force. Also, it will be appreciated that the first part 130 and the second part 132 may be stationary with respect to the fastener 100 while a rotational force is applied to the fastener 100.

Figure 4:
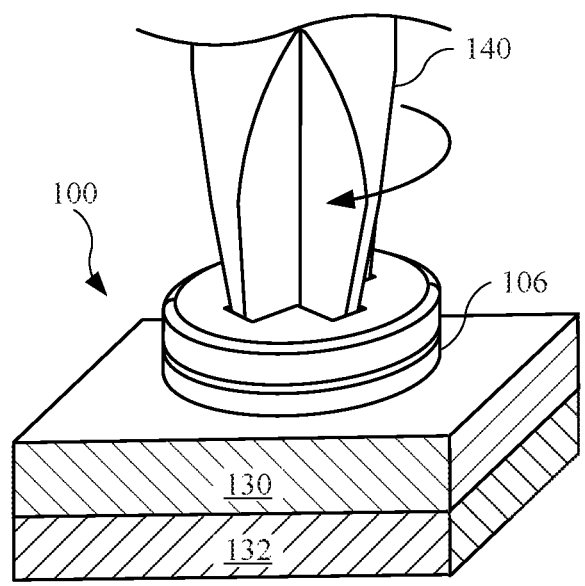
FIG. 4 illustrates an isometric view of the fastener shown in FIG. 3, showing the fastener substantially driven into the first part and the second part.

FIG. 4 illustrates an isometric view of the fastener 100 shown in FIG. 3, showing the fastener 100 substantially driven into the first part 130 and the second part 132. The fastener 100 may be "substantially driven" when, for example, the platform 106 engages the first part 130, and/or when the shaft (not shown) "bottoms out," or engages a bottom wall (not shown) of the second part 132. In either event, the fastener 100 may be require additional rotational force by the tool 140 to further rotationally drive the fastener 100.

Figure 5:
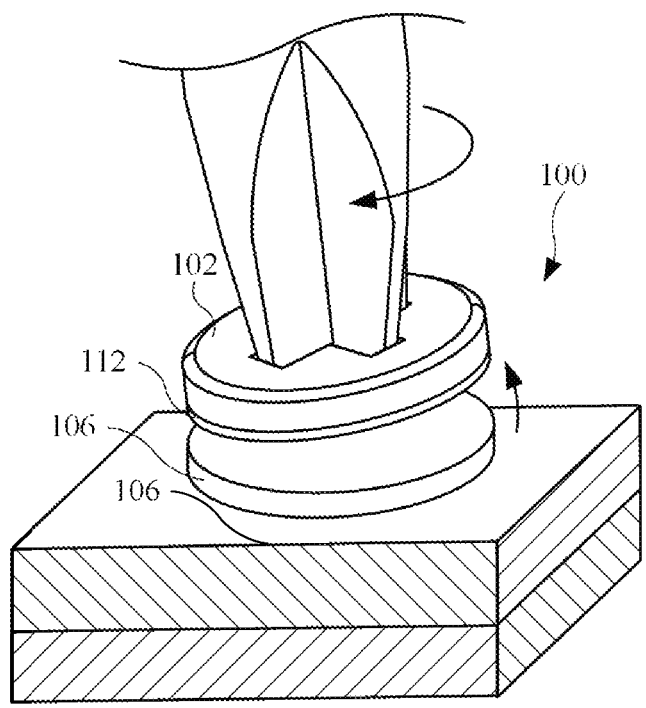
FIG. 5 illustrates an isometric view of the fastener shown in FIG. 4, showing the head decoupling from the platform in response to a force greater than the adhesive bonding force of the material.

However, an additional rotational force, or additional torque, exerted on the fastener 100 may cause an additional force, including shear stress, on the material 112 used to secure the head 102 with the platform 106. Further, when the force is greater than the adhesive bonding force of the material 112, the material 112 may no longer be able to secure together the head 102 with the platform 106. For example, FIG. 5 illustrates an isometric view of the fastener 100 shown in FIG. 4, showing the head 102 decoupling from the platform 106 in response to a force greater than the adhesive bonding force of the material 112. As shown, the head 102, along with the material 112, is removed in response to the rotational force. The adhesive bonding force of the material 112 may be based in part on the chemical makeup of the material 112. In this regard, when the adhesive bonding force of the material 112 is known, the rotational force required to overcome the adhesive bonding force of the material 112 to remove the head 102 can be determined (for example, prior to providing the rotational force). Also, the material and/or roughness of the head 102 and the platform 106 may account for the bond strength between the material 112 and the head 102, and also for the bond strength between the platform 106 and the material 112. For example, when the platform 106 includes a textured, non-planar surface, the adhesive bond between the material 112 and the platform 106 may be enhanced, thereby requiring additional rotational force to overcome the bond between the platform 106 and the material 112.

Figure 6:
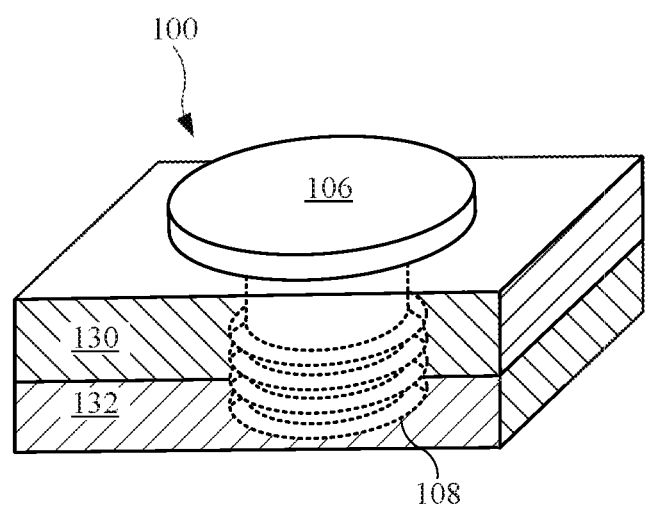
FIG. 6 illustrates an isometric view of the fastener shown in FIG. 5, with the platform remaining subsequent to removal the head and the material (shown in FIG. 5)

FIG. 6 illustrates an isometric view of the fastener 100 shown in FIG. 5, with the platform 106 remaining subsequent to the removal the head 102 and the material 112 (shown in FIG. 5). As shown, the platform 106 along with the shaft 108 may be used to secure the first part 130 together with the second part 132. Also, the platform 106 may include a smooth or flat surface to enhance an overall appearance of the fastener 100, and in turn, an electronic device (not shown) that includes the fastener 100, first part 130 and the second part 132. However, in some instances, the adhesive bond between the platform 106 and the material 112 is different from the adhesive bond between the head 102 and the material 112. For example, the platform 106 may include a surface roughness less than that of the head 102 (shown in FIG. 4) in locations in which the head 102 and the platform 106 are bonded with the material 112. This may cause a stronger bond between the material 112 and the head 102, as compared to that between the platform 106 and the material 112. As a result, the bond between the material 112 and the platform 106 may break down before the bond between the material 112 and the head 102, causing the material 112 to decouple from the platform 106, as shown in FIG. 6. Accordingly, the fastener 100 may include a design detail to control the removal of the material 112 from the platform 106.

In other embodiments, the relative surface roughness of the head 102 and the platform 106 are switched, causing the bond between the head 102 and the material 112 to break down first, such that the material 112 remains on the platform 106. The material 112 may then be used provide a protective coating to the platform 106 against other operations used to form an electronic device (not shown), such as an anodization process in which an electronic device is exposed to an anodic bath with one or more acids designed to form an oxidation layer over a metal (such as an enclosure or housing of the electronic device). In this manner, the material 112 may shield the platform 106 from acidic compounds from the anodic bath. The material 112 may then be removed subsequent to the anodization process. Also, although not shown, the platform 106 may include a rounded or dome-like surface resembling, generally, a semi sphere. This may prevent or limit the ability to remove the fastener 100 from the first part 130 and the second part 132. For example, once the fastener 100 secures the first part 130 with the second part 132, a user may be prevented from sufficiently gripping the fastener 100 and applying a rotational force to the fastener 100 to remove the fastener 100. This may prevent or limit tampering of the electronic device.

The fastener 100 shown and described in FIGS. 3-6 may offer additional advantages. For example, the head 102 may decouple from the platform 106 only in response to a sufficient rotational force. Accordingly, the removal of the head 102 may confirm a sufficient amount of rotational force, or torque, is applied to the fastener 100 such that the fastener 100 is secured with the first part 130 and the second part 132 in a desired manner. In other words, an "under torque" of the fastener 100 may be avoided as the head 102 decoupling from the platform 106 provides an indication of sufficient applied torque. Further, the fastener 100 may be prevented from an "over torque" event due in part to the decoupling between the head 102 and the platform 106, as the decoupling causes a rotational force of the fastener 100 to cease. Accordingly, the fastener 100 is designed to limit the overall torque applied to the fastener 100 by allowing the head 102 to decouple from the platform 106 in response to sufficient rotational force applied to the fastener 100, and in particular, to the material 112. This may prevent damage to the fastener 100 as well as the first part 130 and the second part 132.

Figure 7:
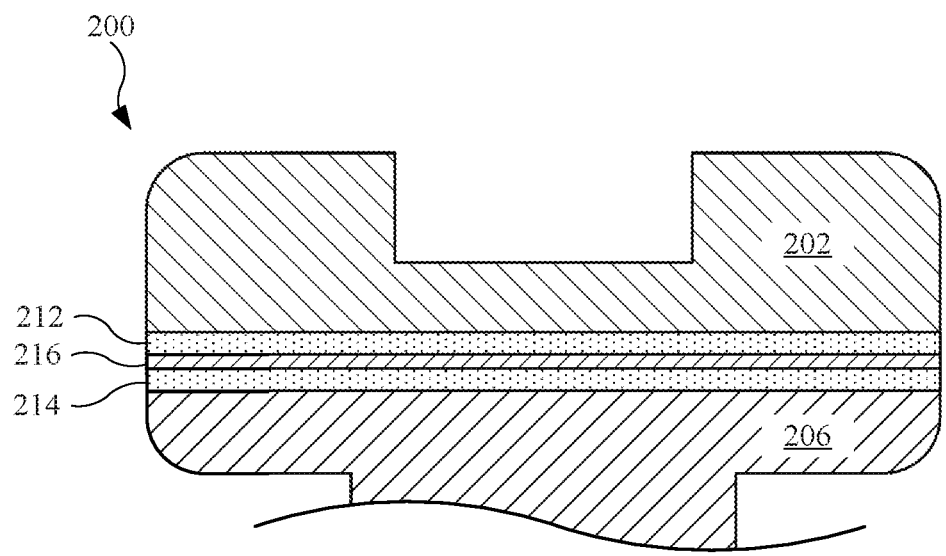
FIG. 7 illustrates a cross sectional view of an alternate embodiment of a fastener that include multiple material layers, in accordance with the described embodiments.
Figure 8:
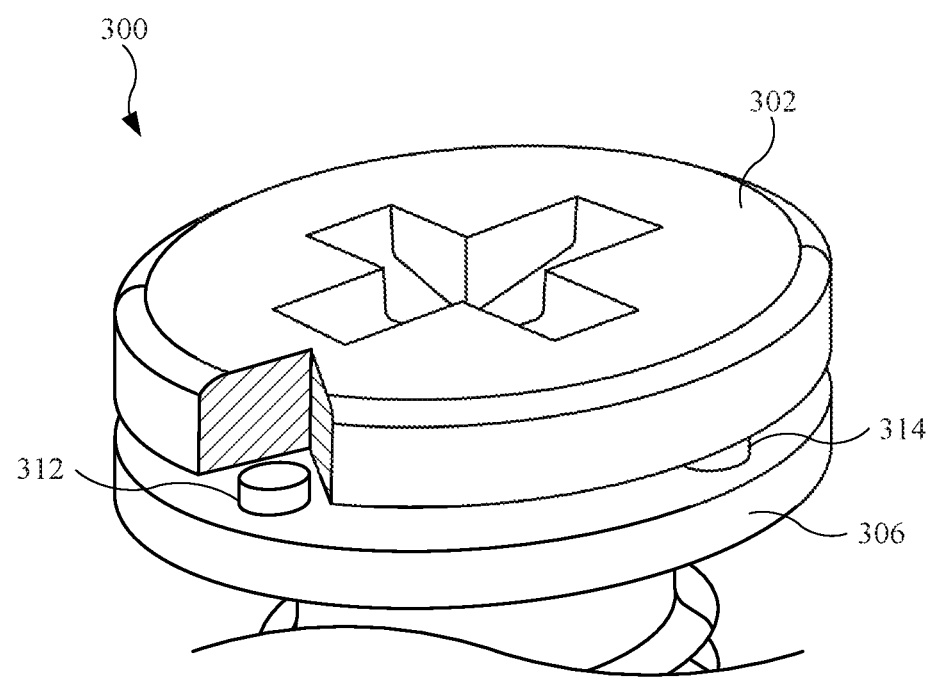
FIG. 8 illustrates an isometric view of an alternate embodiment of a fastener, showing the fastener having a head secured with the platform by several posts, in accordance with the described embodiments.
Figure 9:
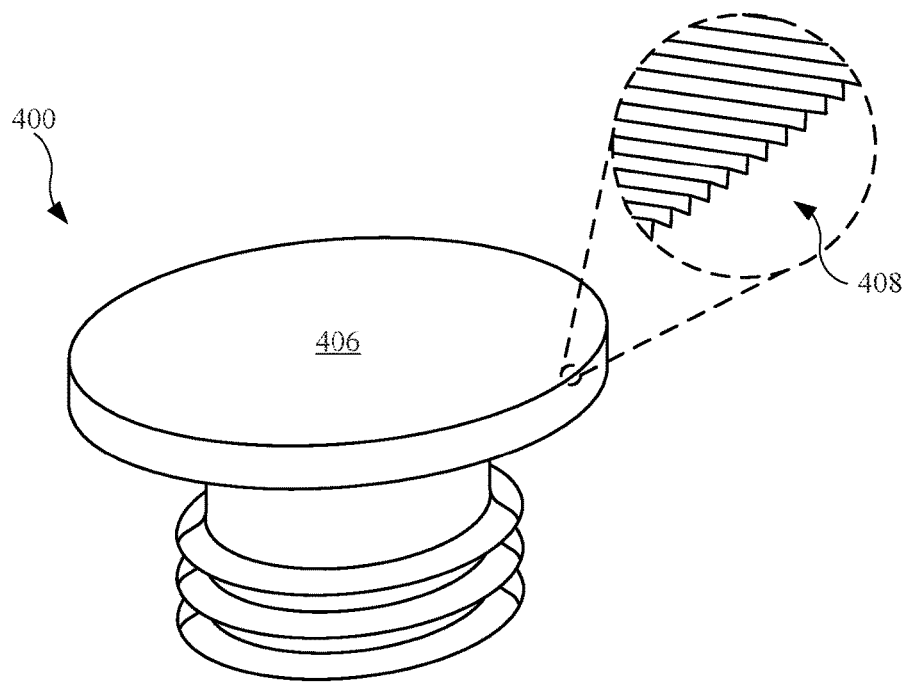
FIG. 9 illustrates an isometric view of an alternate embodiment of a fastener, with a platform of the fastener having ridges that may be used in conjunction with a tool, in accordance with the described embodiments.

FIGS. 7-9 illustrate alternate embodiments of a fastener. However, the fasteners shown and described in FIGS. 7-9 may include several feature or features previously described for a fastener, such as a head, a platform, and a material that secures the head with the platform. FIG. 7 illustrates a cross sectional view of an alternate embodiment of a fastener 200 that include multiple material layers, in accordance with the described embodiments. For example, the fastener 200 may include a head 202 secured with a platform 206 by a material assembly that includes a first type material surrounding a second type material. For example, the first type material may include a first adhesive layer 212 and a second adhesive layer 214. The first adhesive layer 212 and the second adhesive layer 214 may include a first (predetermined) bonding force or first bonding strength. The second type material may include a third adhesive layer 216 sandwiched between the first adhesive layer 212 and the second adhesive layer 214. In some embodiments, the third adhesive layer 216 includes a polyamide material. The third adhesive layer 216 may include a second (predetermined) bonding force or bonding strength different from that of the first adhesive layer 212 and the second adhesive layer 214.

In some embodiments, the third adhesive layer 216 provides a bonding force or bonding strength that is less than that of the first adhesive layer 212 and the second adhesive layer 214. In this manner, a rotational force applied to the fastener 200 may cause the third adhesive layer 216 to fail or break down at an interface between the first adhesive layer 212 and the third adhesive layer 216, and/or at an interface between the second adhesive layer 214 and the third adhesive layer 216. In this manner, the platform 206 may not be affected by shear stresses from the rotational force as the adhesive breakdown occurs only at an interface (and/or interfaces) between adhesives and not at the platform 206. Accordingly, the fastener 200 may undergo less stress, thereby reducing the likelihood of breaking.

FIG. 8 illustrates an isometric view of an alternate embodiment of a fastener 300, showing the fastener 300 having a head 302 secured with the platform 306 by several posts, in accordance with the described embodiments. Rather than using adhesives, the head 302 may be secured with the platform by, for example, a first post 312 and a second post 314. A partial cross sectional view of the head 302 is shown to reveal the first post 312. While only two posts are shown in FIG. 8, the fastener 300 may include additional posts. In some embodiments, the first post 312 and the second post 314 are secured with the head 302 and the platform 306 by an adhesive (not shown) having a known bonding force or bonding strength. Alternatively, the fastener 300 may undergo a machining operation to remove material and define the first post 312 and the second post 314 (and any additional posts). In this regard, the fastener 300 includes a single body of a known material (or materials) that define the fastener 300. In either event, the properties (including bonding forces or material properties) used to secure the head 302 with the platform 306 are known. Accordingly, a rotational force may be applied to the head 302 sufficient to overcome and break down the adhesive bonds, in the first example, or break the first post 312 and the second post 314 (and any additional posts), in the second example, causing the head 302 to decouple from the platform 306 in a manner previously described. Regarding the latter, any remains of the posts may be removed from the platform 306 by a subsequent machining operation.

FIG. 9 illustrates an isometric view of an alternate embodiment of a fastener 400, with a platform 406 of the fastener 400 having ridges 408 that may be used in conjunction with a tool (not shown), in accordance with the described embodiments. A head used to facilitate a rotational force is removed for purposes of illustration. However, the fastener 400 may include a head used in any manner previously described for a head of a fastener. As shown in the enlarged view, the ridges 408 of the platform 406 are disposed across the platform 406. The ridges 408 may be referred to as micro-ridges as the ridges may be relatively small, with the pitch between adjacent rides having being less than 1 millimeter.

Figure 10:
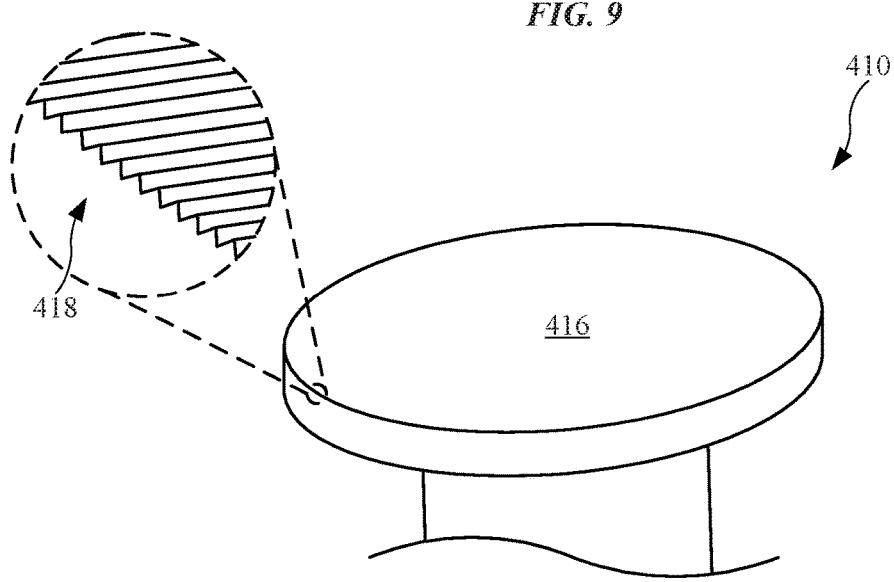
FIG. 10 illustrates an embodiment of a tool used to engage the ridges of the platform in FIG. 9.

FIG. 10 illustrates an embodiment of a tool 410 used to engage the ridges 408 of the platform 406 shown in FIG. 9. As shown, the tool 410 may include ridges 418 designed to mate with the ridges 408 shown in FIG. 9. Accordingly, the ridges 418 may be disposed across a platform 416 of the tool in locations corresponding to the ridges 408 of the platform 406 in FIG. 9, and may also include a similar pitch between adjacent ridges. In this manner, the tool 410 provides a "key" in the form of the ridges 418 designed to pair with a "keyhole" in the form of the ridges 408 of the platform 406, allowing the tool 410 to engage the platform 406 and provide a rotational force to rotationally drive the fastener 400. This may allow the fastener 400 to be removed from the parts after the fastener 400 has previously secured together the parts and a head (not shown) is removed from the fastener 400. In this manner, the fastener 400 may allow for a rework operation of an electronic device (not shown). Also, the tool 410 may include a proprietary tool distributed only by the manufacturer of the fastener 400.

Figure 11:
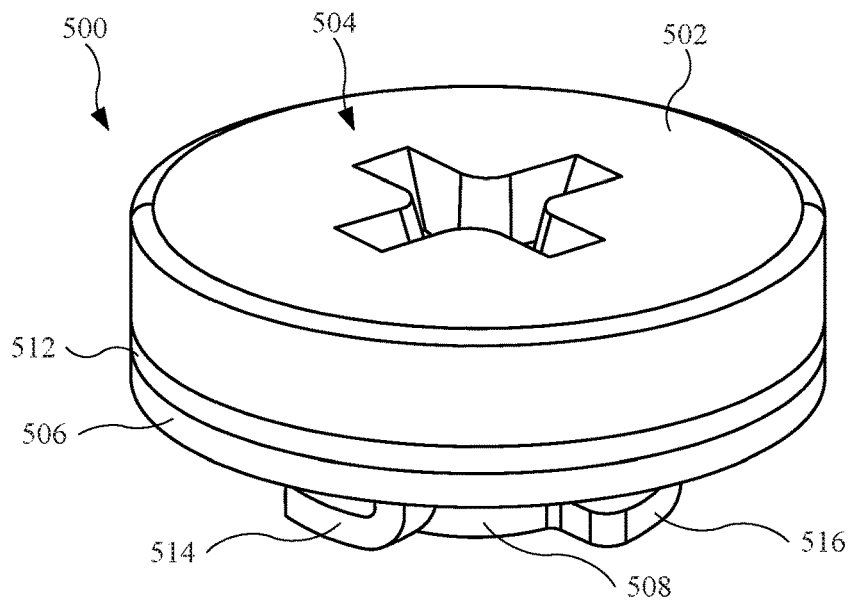
FIG. 11 illustrates an isometric view of an alternative embodiment of a fastener having a shaft that includes several blades extending radially outward from the shaft.

FIG. 11 illustrates an isometric view of an alternative embodiment of a fastener 500 having a shaft 508 that includes several blades extending radially outward from the shaft 508. As shown, the fastener 500 may include a head 502 having a recess 504 designed to receive a tool (not shown). Also, the head 502 may be secured with a platform 506 by a material 512 that may include any material or materials previously described for a material that secures a head with a platform. This may allow the head 502 to decouple in response to a shear stress exerted on the material 512 by providing a rotational force to the head 502 in a manner previously described.

As shown, the shaft 508 includes a first blade 514 and a second blade 516. The shaft 508 may also include a third blade (shown below). The number of blades may vary in other embodiments. Also, the blades may replace a threaded region show in previous embodiments of a fastener, and the fastener 500 may use the blades to secure together two or more parts. The blades are designed to frictionally couple with one or more features of at least one of the parts. This will be shown below. Further, the shaft 508 carrying the blades may be adjusted in length based upon the size and the number of parts secured together by the fastener 500.

Figure 12:
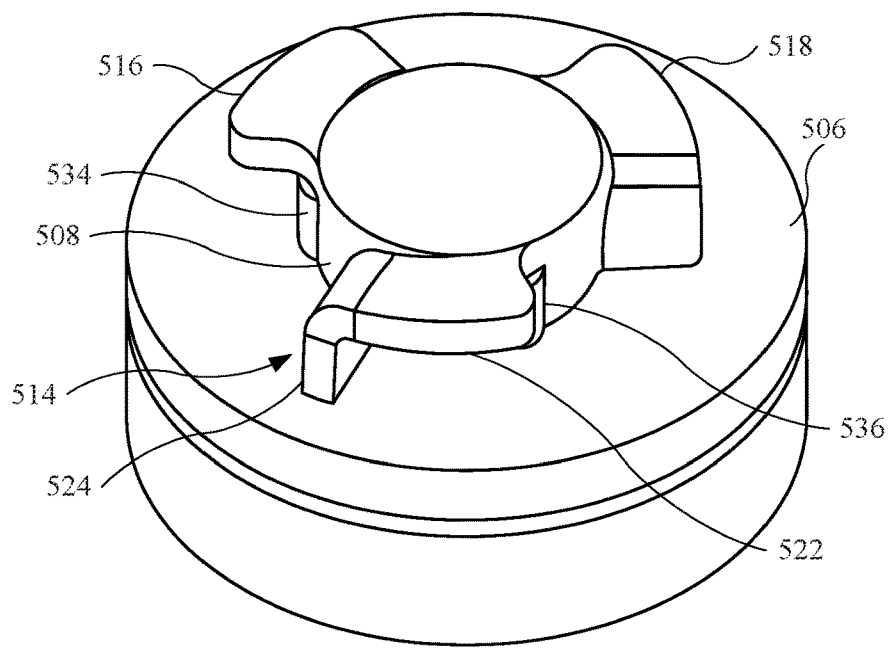
FIG. 12 illustrates an isometric bottom view of the fastener shown in FIG. 11, showing the blades as well as several protrusions.

FIG. 12 illustrates an isometric bottom view of the fastener 500 shown in FIG. 11, showing the blades as well as several protrusions. As shown, the first blade 514, the second blade 516, and a third blade 518 may extend radially outward from the shaft 508. Also, each blade may generally include an L-shape configuration. For example, the first blade 514, representative of the remaining blades, may include a first portion 522 designed to slide and engage at least one of the parts. The first blade 514 may further include a second portion 524 coupled with, and perpendicular with respect to, the first portion 522. The second portion 524 may be used as a stop that abuts the same part (and/or an additional part) engaged with the first portion 522. Also, the second portion 524 may extend to a rear portion of the platform 506 as shown in FIG. 12. However, in other embodiments, the second portion 524 does not extend to the rear portion of the platform 506.

Also, the fastener 500 may include several protrusions extending from the shaft 508. As shown, the fastener 500 includes a first protrusion 534 and a second protrusion 536. The fastener 500 may further and a third protrusion (shown below). In some embodiments, the number of protrusions is equal to the number of blades. As shown, the first protrusion 534 is positioned between the first blade 514 and the second blade 516, and the second protrusion 536 is positioned between the first blade 514 and the third blade 518. Although not shown, the third protrusion may be positioned between the second blade 516 and the third blade 518. The protrusions may combine to provide an interlock with at least one of the parts fastened by the fastener 500. Further, the interlock may provide by a frictional force between the protrusions and the part, which may resist or prevent the fastener 500 from loosening and/or decoupling from the parts. This will be shown below.

Figure 13:
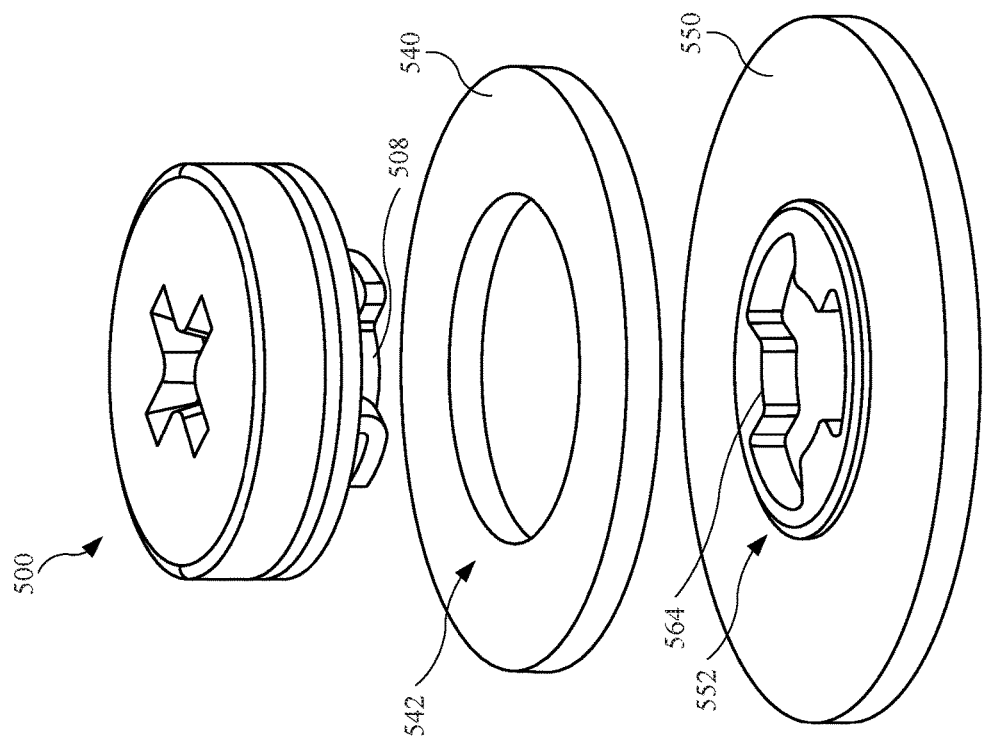
FIG. 13 illustrates an exploded view of the fastener shown in FIGS. 11 and 12, further illustrating the fastener used to secure together two parts.

FIG. 13 illustrates an exploded view of the fastener 500 shown in FIGS. 11 and 12, further illustrating the fastener 500 used to secure together two parts. The shaft 508, along with the blades and the protrusions, may extend through an opening 542 of a first part 540. As shown in FIG. 13, the first part 540 may include a washer used to facilitate a securing operation between the fastener 500 and a second part 550. However, in other embodiments, the first part 540 is a structural component of an electronic device (not shown) used to support or carry another structural component of the electronic device.

The second part 550 may include a plate that secures with the fastener 500. However, in other embodiments, the second part 550 includes an structural component of an electronic. As shown, the second part 550 includes an opening 552 through which the shaft 508, along with the blades and the protrusions, may at least partially extend. The opening 552 of the second part 550 may include extensions, or ramps, or other inclined features designed to engage with the protrusions (shown in FIG. 12) of the shaft 508 to define the interlock previously described. For example, the second part 550 may include a first extension 564 used to engage the first protrusion 534 (shown in FIG. 12).

Figure 14:
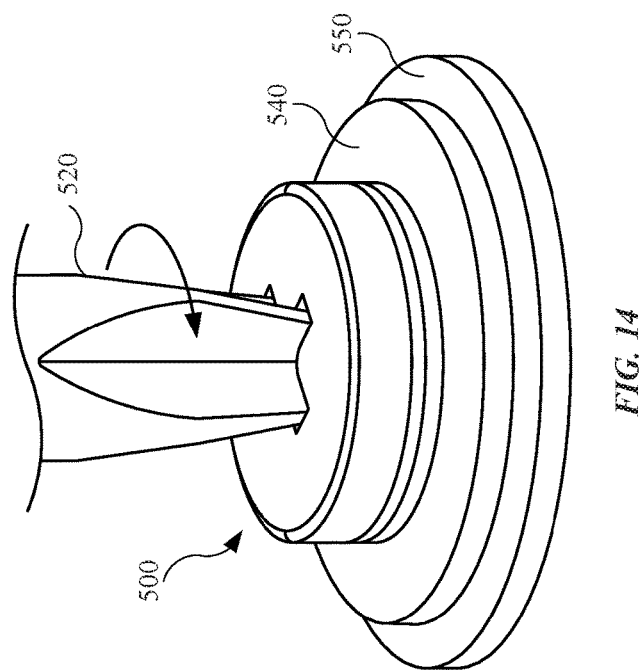
FIG. 14 illustrates an isometric view of the fastener shown in FIG. 13, further showing the fastener being rotationally driven to fasten the first part with the second part.

FIG. 14 illustrates an isometric view of the fastener 500 shown in FIG. 13, further showing the fastener 500 rotationally driven to fasten the first part 540 with the second part 550. As shown, a tool 520 is used to rotationally drive the fastener 500. When the shaft 508 (shown in FIG. 13) is positioned in the first part 540 and the second part 550, the fastener 500 may be rotationally driven such that the blades engage the second part 550. This will be shown below.

Figure 15:
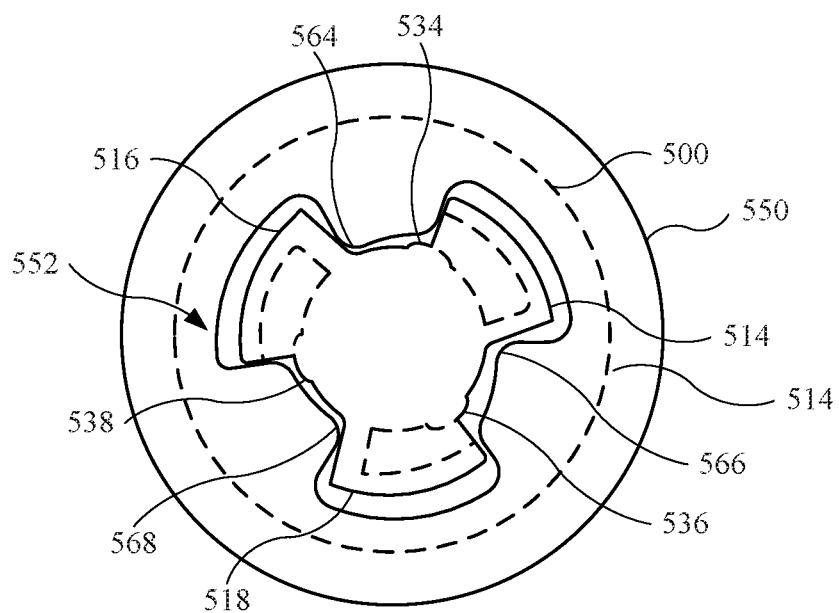
FIG. 15 illustrates a bottom view of the fastener shown in FIGS. 13 and 14, with the blades extending at least partially through the opening of the second part.

FIG. 15 illustrates a bottom view of the fastener 500 shown in FIGS. 13 and 14, with the blades extending at least partially through the opening 552 of the second part 550. As shown, the opening 552 of the second part 550 accommodate the first blade 514, the second blade 516, and the third blade 518. The opening 552 may also accommodate the first protrusion 534, the second protrusion 536, and a third protrusion 538. Also, as shown in FIG. 15, the second part 550 may include several extensions, such as a first extension 564, a second extension 566, and a third extension 568. The number of extensions of the second part 550 may include the same number as that of the protrusions of the fastener 500. Also, although not shown, the first part 540 may be positioned between the fastener 500 and the second part 550 in a manner similar to that shown in FIG. 14.

Figure 16:
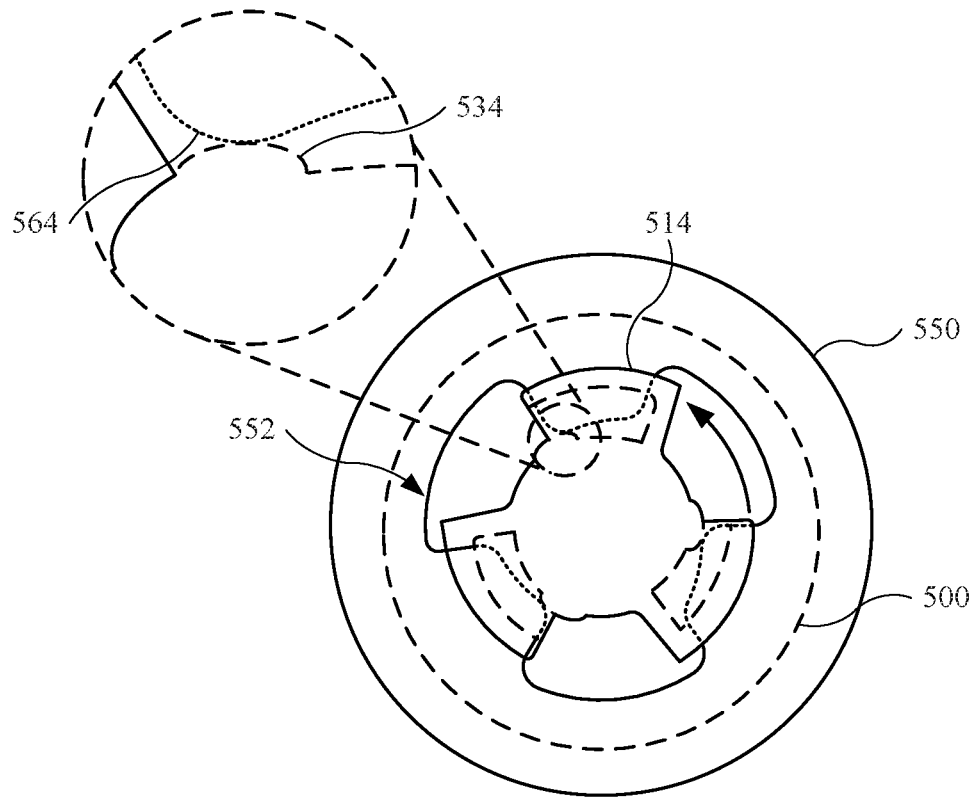
FIG. 16 illustrates a bottom view of the fastener shown in FIG. 15, with the fastener rotated with respect to the second part, causing the fastener to engage the second part.

FIG. 16 illustrates a bottom view of the fastener 500 shown in FIG. 15, with the fastener 500 rotated with respect to the second part 550, causing the fastener 500 to engage the second part 550. As shown, the protrusions of the fastener 500 may engage the extensions of the second part 550. For example, in the enlarged view, the fastener 500 is rotated such that the first protrusion 534 engages the first extension 564. In this regard, the first extension 564, as well as the remaining extensions, may include an asymmetric design that allows the first blade 514 to fit into the opening 552, while also allowing the fastener 500 to rotate (in the opening 552) such that the first protrusion 534 engaged the first extension 564 to lock the fastener 500 with the second part 550. The engagement between the first protrusion 534 and the first extension 564 may be a representative engagement between the remaining protrusions and extensions. This engagement provides a frictional force designed to limit or prevent the fastener 500 from loosening and/or decoupling from the second part 550.

Figure 17:
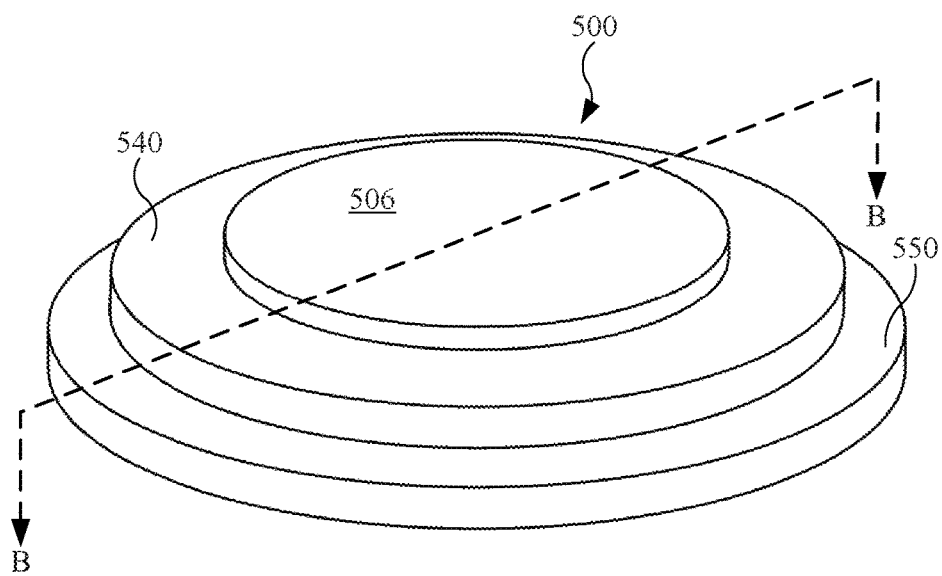
FIG. 17 illustrates an isometric view of the first part and the second part secured together by way of the fastener, with the head removed subsequent to a rotation of the fastener.

FIG. 17 illustrates an isometric view of the first part 540 and the second part 550 secured together by way of the fastener 500, subsequent to a rotational operation to the fastener 500 that causes the head (not shown) to decouple from the fastener 500, in accordance with the described embodiments. As shown, the platform 506 remains after the head is removed. Further, the platform 506 may combine with the blades (not shown) to provide a retaining force to maintain the first part 540 with the second part 550, as the platform 506 engages the first part 540 and the blades engage the second part 550. Also, as shown in FIG. 17, the second part 550 may be referred to as a furthermost part, relative to the first part 540, to the platform 506. Further, in other embodiments, with three or more parts, the furthermost part may be the part furthest from the platform 506, relative to the remaining parts. Also, the furthermost part may include an opening having features (such as the extensions) that interlock with the fastener 500.

Figure 18:
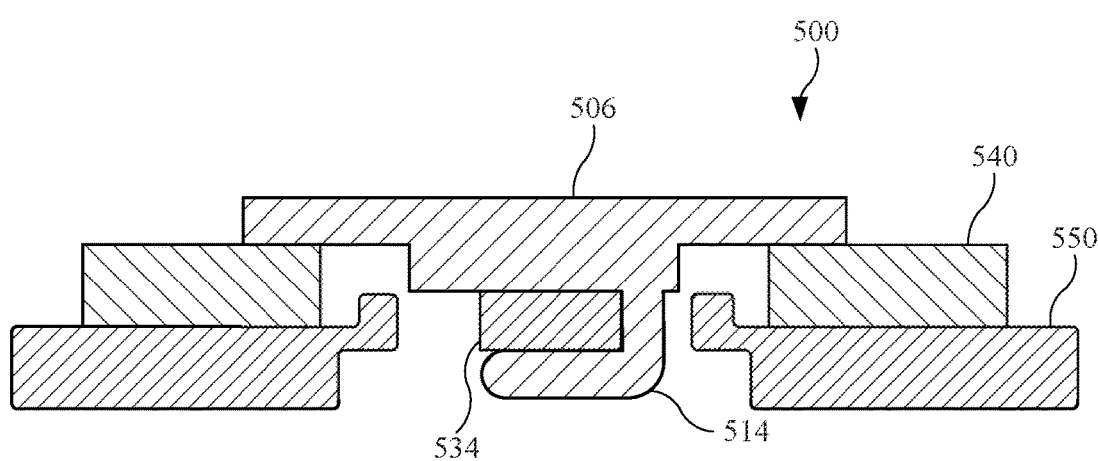
FIG. 18 illustrates a cross sectional view of the fastener, the first part, and the second part, shown in FIG. 17, taken along line B-B in FIG. 17.

FIG. 18 illustrates a cross sectional view of the fastener 500, the first part 540, and the second part 550, shown in FIG. 17, taken along line B-B in FIG. 17. As shown, when the fastener 500 is rotated with respect to the second part 550, the first blade 514 engages the first extension 564 by securing around the first extension 564. Although not shown, the first extension 564 is engaged with the first protrusion 534 (shown in FIG. 16). The remaining blades may engage the remaining extensions in a similar manner, and the fastener 500 interlocks with the second part 550, and the first part 540 is secured together the second part 550.

Figure 19:
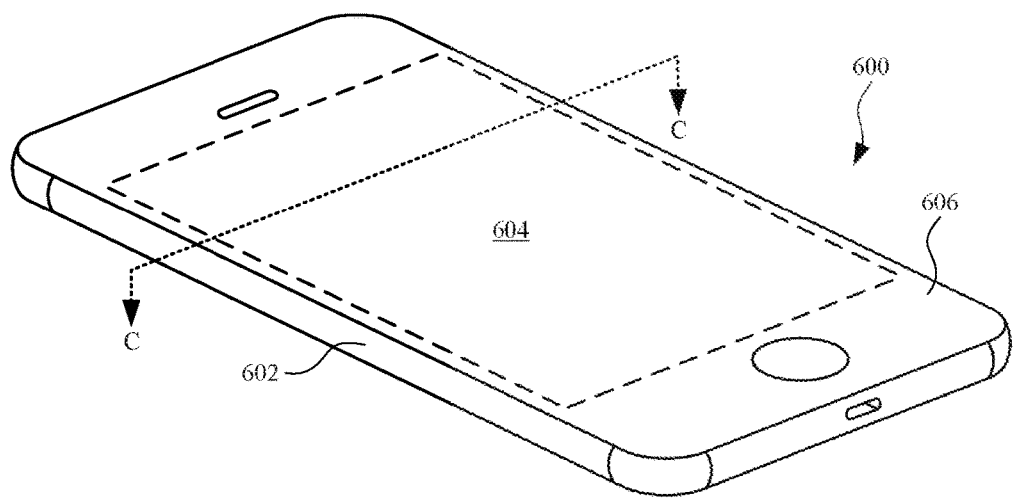
FIG. 19 illustrates an isometric view of an embodiment of an electronic device.

FIG. 19 illustrates an isometric view of an embodiment of an electronic device 600. In some embodiments, the electronic device 600 is a tablet device. In the embodiment shown in FIG. 19, the electronic device 600 is a smartphone used as mobile telecommunication device. The electronic device 600 may include several components commonly used in an electronic device, such as an enclosure 602 that encloses several internal components (such as processor circuits, memory circuits, battery, etc.). The electronic device 600 may also include a display assembly 604 overlaid by a protective cover 606 formed from a transparent material, such as glass or sapphire.

Figure 20:
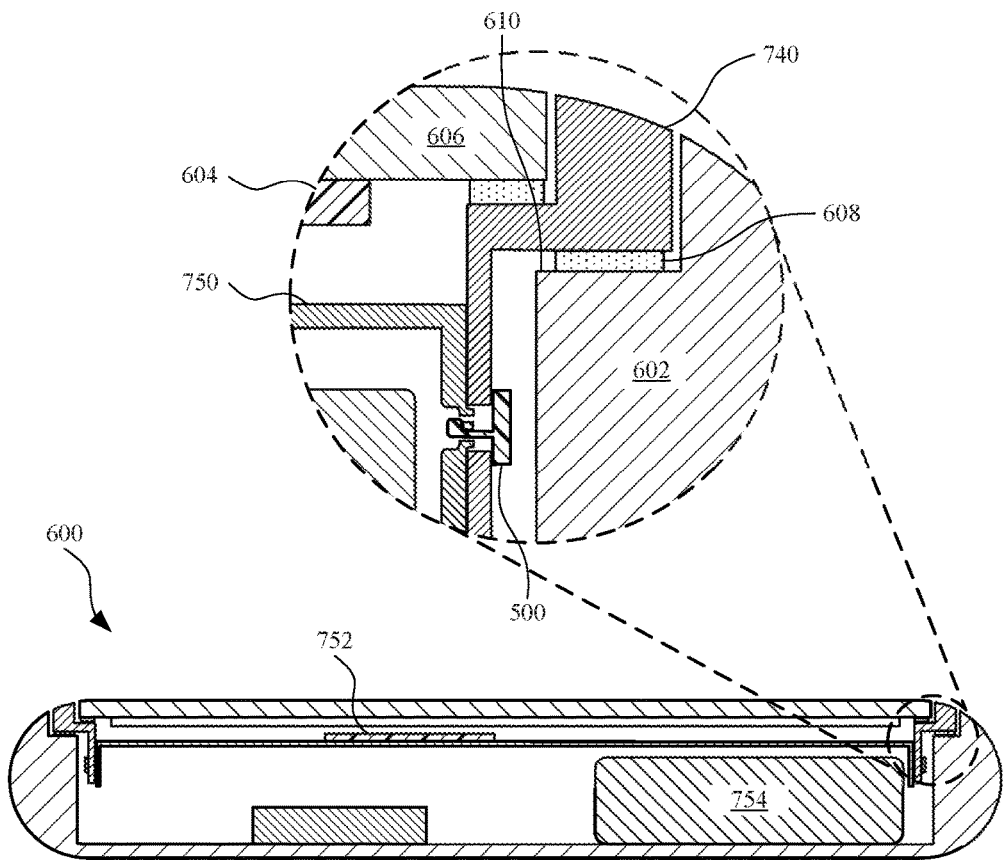
FIG. 20 illustrates a cross sectional view of the electronic device shown in FIG. 19, taken along line C-C in FIG. 19, showing the fastener used to secure a first part with a second part, in accordance with the described embodiments.

FIG. 20 illustrates a cross sectional view of the electronic device 600 shown in FIG. 19, taken along line C-C in FIG. 19, showing the fastener 500 used to secure a first part 740 with a second part 750, in accordance with the described embodiments. As shown in the enlarged view, the first part 740 is adhesively secured with the enclosure 602 by an adhesive 608. Also, the first part 740 may include a support feature or frame that supports the display assembly 604 and the protective cover 606. Also, the second part 750 may include a support feature that carries an operational component, such as an integrated circuit 752. Also, as shown in the enlarged view, both the first part 740 and the second part 750 may include an opening (not labeled) to receive the fastener, with the second part 750 having an opening with features (such as the extensions) shown and described for an opening 552 shown in FIGS. 15 and 16.

Prior to assembling the first part 740 and the second part 750 in the electronic device 600, the first part 740 and the second part 750 may be assembled together by the fastener 500 in a prior sub-assembly. This allows for the fastener 500 to secure together the two parts, and also to remove a head (not) of the fastener 500 by a rotational driving force in a manner previously described. The fastener 500 may offer several advantages. For example, after the first part 740 is secured with the second part 750 (by the fastener 500) and both are installed in the electronic device 600, the first part 740 may move laterally (horizontally, as shown) with respect to the enclosure 602 in order to optimize an adhesive interface surface 610 of the enclosure 602. In other words, an amount of the adhesive interface surface 610 available to adhesively bond the first part 740 with the enclosure 602 may be increased, due in part to the fastener 500 having only a platform, and not a head (previously coupled with the platform), that could otherwise engage the enclosure 602. This may allow the first part 740 to be positioned closer to the enclosure 602.

Also shown in enlarged view, the shaft of the fastener 500 may be sub-flush with respect to the second part 750 such that fastener 500 (including the blades) does not protrude outward with respect to the second part 750 in a direction toward a second operational component 754. Traditional fasteners having a minimum number of threads in order to secure together the first part 740 with the second part 750 may require a fastener to protrude outward from the second part 750, and the second operational component 754 is prone to damage from the fastener 500. However, the fastener 500 having several blades, rather than a threaded configuration, allows for a low-profile fastener having a relatively small shaft such that the fastener 500 remains sub-flush with respect to the second part 750 (as shown in FIG. 20), thereby reducing the likelihood of contacting the second operational component 754.

Figure 21:
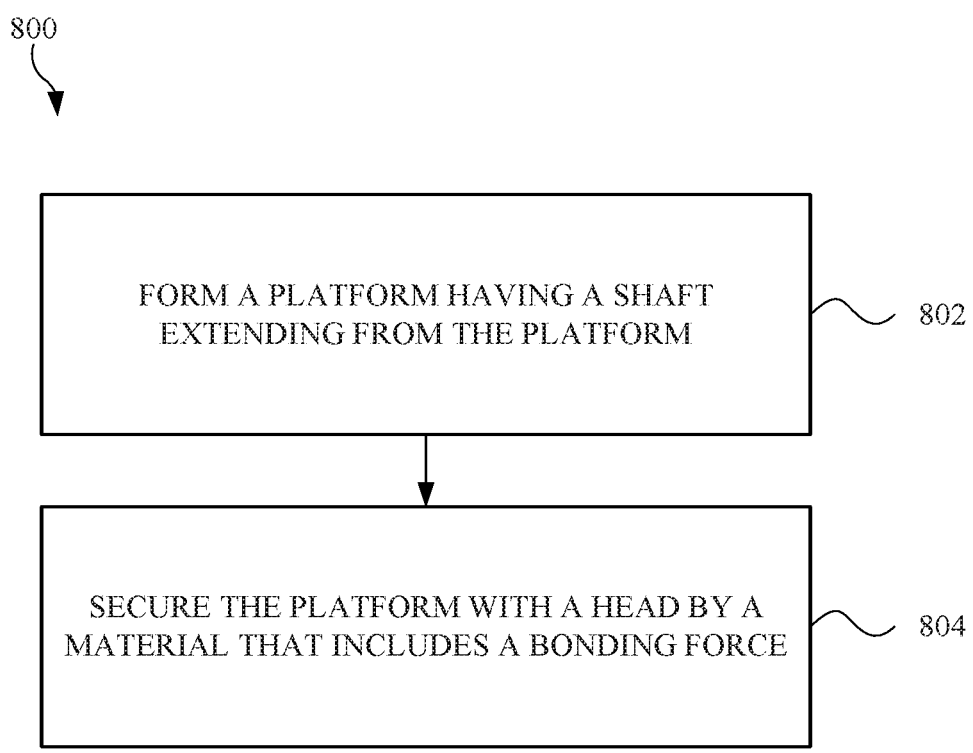
FIG. 21 illustrates a flowchart showing a method for making a fastener suitable for securing a first part with a second part, in accordance with the described embodiments.

FIG. 21 illustrates a flowchart 800 showing a method for making a fastener suitable for securing a first part with a second part, in accordance with the described embodiments. In step 802, a platform is formed. The platform may include a shaft extending from the platform. In some embodiments, the platform is a flat or planar surface. In some embodiments, the platform includes a ridge (or ridges) that define a key such that a tool having a corresponding ridge (or ridges) may mate with the key to rotational drive the platform. In some embodiments, the aforementioned shaft includes threads. In other embodiments, the aforementioned shaft includes several blades. Regarding the latter, the shaft may further include protrusions designed to engage extensions of one of the second part, and interlock the shaft (and in turn, the fastener) with the second part.

In step 804, the platform is secured with a head by a material that includes a bonding force. In some instances, in response to a rotational force to the head greater than the bonding force, the head decouples from the platform. In this regard, the material may include an adhesive that provides an adhesive bonding force. The adhesive bonding force may be predetermined or known, based upon the chemical makeup of the adhesive. In this regard, a predetermined rotational force provided by a tool, for example, to the fastener that is greater than the adhesive bonding force causes shear stress to the adhesive and breaks down the adhesive. When the adhesive breaks down, the head may decouple from the platform.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A fastener comprising:
a platform having a shaft extending from the platform, the shaft capable of securing to at least one of a first part and a second part; and
a head bonded with the platform by a material that includes a bonding force, wherein a rotational force to the head greater than the bonding force causes the head to decouple from the platform.

2. The fastener of claim 1, wherein the material comprises an adhesive having an adhesive bonding force.

3. The fastener of claim 2, wherein the shaft comprises a threaded region configured for threaded engagement with at least one of the first part and the second part.

4. The fastener of claim 1, wherein the head comprises a recess capable of receiving a tool, wherein the rotational force to the head comprises a rotational force by the tool.

5. The fastener of claim 1, wherein:
a first surface defined by the head, the first surface engaged with the material and comprising a first surface roughness,
a second surface defined by the platform, the second surface engaged with the material and comprising a second surface roughness different from the first surface roughness, and
the rotational force causes the material to decouple from the second surface such that the material remains engaged with the first surface.

6. The fastener of claim 1, wherein:
the head includes a first dimension along an axis defined by the shaft,
the platform includes a second dimension along the axis defined by the shaft, and
the second dimension different from the first dimension.

7. The fastener of claim 6, the second dimension is less than the first dimension.

8. A method for forming a fastener the method comprising:
forming a platform having a shaft extending from the platform, the shaft capable of securing to at least one of a first part and a second part; and
securing the platform with a head by a material that includes a bonding force, wherein a rotational force to the head greater than the bonding force causes the head to decouple from the platform.

9. The method of claim 8, wherein securing the platform with the head by the material comprises providing an adhesive, the adhesive defining the bonding force.

10. The method of claim 8, wherein the shaft comprises a threaded region configured for threaded engagement with at least one of the first part and the second part.

11. The method of claim 8, further comprising:
forming a first surface defined by the head, the first surface engaged with the material and comprising a first surface roughness,
forming a second surface defined by the platform, the second surface engaged with the material and comprising a second surface roughness different from the first surface roughness, wherein the rotational force causes the material to decouple from the second surface such that the material remains engaged with the first surface.

12. The method of claim 8, wherein the shaft comprises a threaded region configured for threaded engagement with at least one of the first part and the second part.

13. The method of claim 12, further comprising a non-threaded portion, wherein the non-threaded portion is positioned between the platform and the threaded region.

14. A fastener, comprising:
a head comprising a first portion and a second portion;
a bonding material that couples the first portion with the second portion; and
a shaft extending from the second portion, wherein a rotational force to the head that causes the shaft to couple a first part with a second part further causes the first portion to break away from the second portion such that the second portion is engaged with the first part.

15. The fastener of claim 14, wherein the shaft comprises:
a threaded portion; and
a non-threaded portion, wherein the non-threaded portion is positioned between the second portion and the threaded portion.

16. The fastener of claim 14, wherein the bonding material comprises an adhesive, and wherein the rotational force causes the adhesive to break away from the second portion such that the adhesive remains on the first portion.

17. The fastener of claim 14, wherein:
the first portion includes a first dimension along an axis defined by the shaft,
the second portion includes a second dimension along the axis defined by the shaft, and
the second dimension is less than the first dimension.

18. The fastener of claim 14, wherein the head comprises a recess capable of receiving a tool that provides the rotational force.

19. The fastener of claim 14, further comprising:
a platform extending from the shaft;
a first surface defined by the head, the first surface engaged with the bonding material and comprising a first surface roughness,
a second surface defined by the platform, the second surface engaged with the bonding material and comprising a second surface roughness different from the first surface roughness, and
the rotational force causes the bonding material to decouple from the second surface such that the material remains engaged with the first surface.

20. The fastener of claim 14, wherein the bonding material is positioned between the first portion and the second portion, and bonding material extends to an outer edge of the first portion and the second portion.

* * * * *